(12) United States Patent
Lifson

(10) Patent No.: US 8,271,352 B2
(45) Date of Patent: Sep. 18, 2012

(54) SYSTEM AND METHOD OF PROVIDING RECOMMENDATIONS

(75) Inventor: David M. Lifson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/169,841

(22) Filed: Jun. 27, 2011

(65) Prior Publication Data

US 2011/0258073 A1 Oct. 20, 2011

Related U.S. Application Data

(63) Continuation of application No. 11/854,506, filed on Sep. 12, 2007, now Pat. No. 7,970,665.

(51) Int. Cl.
*G06Q 30/00* (2012.01)

(52) U.S. Cl. .............. 705/26.7; 705/14.4; 705/14.49; 705/26.1; 705/319

(58) Field of Classification Search .............. 705/14.4, 705/14.49–14.67, 319
See application file for complete search history.

(56) References Cited

U.S. PATENT DOCUMENTS

| | | | |
|---|---|---|---|
| 6,963,850 B1 | 11/2005 | Bezos et al. | |
| 7,240,055 B2 | 7/2007 | Grasso et al. | |
| 7,254,552 B2 | 8/2007 | Bezos et al. | |
| 7,519,562 B1 | 4/2009 | Vander Mey et al. | |
| 7,689,452 B2 | 3/2010 | Lam et al. | |
| 7,698,165 B1 | 4/2010 | Tawakol et al. | |
| 7,739,153 B1 | 6/2010 | Anderson et al. | |
| 7,756,756 B1 | 7/2010 | Lifson | |
| 7,970,665 B1 * | 6/2011 | Lifson | 705/26.7 |
| 2001/0037255 A1 | 11/2001 | Tambay et al. | |
| 2003/0093329 A1 | 5/2003 | Gutta | |
| 2003/0093793 A1 | 5/2003 | Gutta | |
| 2003/0167222 A1 | 9/2003 | Mehrotra et al. | |
| 2003/0172004 A1 | 9/2003 | Anderson | |
| 2003/0220802 A1 | 11/2003 | Cossey et al. | |
| 2004/0059626 A1 | 3/2004 | Smallwood | |
| 2004/0230511 A1 | 11/2004 | Kannan et al. | |
| 2005/0033656 A1 | 2/2005 | Wang et al. | |
| 2005/0171955 A1 | 8/2005 | Hull et al. | |
| 2005/0177385 A1 | 8/2005 | Hull et al. | |
| 2005/0203807 A1 | 9/2005 | Bezos et al. | |
| 2005/0261989 A1 | 11/2005 | Vadron et al. | |
| 2005/0273378 A1 | 12/2005 | MacDonald-Korth et al. | |
| 2006/0026033 A1 | 2/2006 | Brydon et al. | |
| 2006/0085259 A1 | 4/2006 | Nicholas et al. | |

(Continued)

OTHER PUBLICATIONS

Next-Generation Flavor in Integrated Online Catalogs., Library Technology Reports, Jul./Aug. 2007, vol. 43, Issue 4, Chicago.

*Primary Examiner* — William Allen
(74) *Attorney, Agent, or Firm* — Knobbe Martens Olson & Bear LLP

(57) ABSTRACT

A method of providing recommendations is disclosed and includes receiving a selection of an offering via an online site. The method also includes outputting a detail page related to the offering via the online site. The detail page includes a first selectable indicator corresponding to a social network of a visitor and a second selectable indicator corresponding to unfiltered content. The method also includes outputting at least one recommendation via the detail page. Each recommendation is associated with a member of the social network when input received via the online site indicates a selection of the first selectable indicator.

25 Claims, 7 Drawing Sheets

U.S. PATENT DOCUMENTS

| | | |
|---|---|---|
| 2006/0200432 A1 | 9/2006 | Flinn et al. |
| 2006/0218153 A1 | 9/2006 | Voon et al. |
| 2006/0218225 A1 | 9/2006 | Hee Voon et al. |
| 2007/0064626 A1 | 3/2007 | Evans |
| 2007/0179863 A1 | 8/2007 | Stoll |
| 2008/0033739 A1 | 2/2008 | Zuckerberg et al. |
| 2008/0189274 A1 | 8/2008 | Mann |
| 2008/0189768 A1 | 8/2008 | Callahan et al. |
| 2008/0235111 A1 | 9/2008 | Dotan et al. |
| 2008/0243628 A1 | 10/2008 | Wiseman et al. |
| 2008/0255933 A1 | 10/2008 | Leventhal et al. |
| 2008/0255934 A1 | 10/2008 | Leventhal et al. |

* cited by examiner

SYSTEM AND METHOD OF PROVIDING RECOMMENDATIONS

CROSS-REFERENCE TO RELATED APPLICATION

This application is a continuation of U.S. patent application Ser. No. 11/854,506, entitled "System and Method of Providing Recommendations," filed Sep. 12, 2007, the entirety of which is incorporated herein by reference.

FIELD OF THE DISCLOSURE

The present disclosure is generally related to providing recommendations related to offerings available for purchase via an online site.

BACKGROUND

Products, services, subscriptions, and other offerings are available via online sites. Online sites can provide recommendations of similar or related products based on what other customers have purchased or viewed. Nonetheless, these generic recommendations may not be effective to persuade a visitor to the online site to make a purchase. For example, the use of generic recommendations can often produce lists of recommendations that are too long to be useful to the visitor. Hence, there is a need for an improved system and method of providing recommendations.

DETAILED DESCRIPTION OF THE DRAWINGS

A system to provide recommendations is disclosed and includes a server system having processing logic and memory accessible to the processing logic. The memory includes instructions executable by the processing logic to provide an online site and receive input indicating a selection of an offering via the online site. The memory also includes instructions executable by the processing logic to output a detail page via the online site. The detail page including a first selectable indicator corresponding to content filtered by a social network and a second selectable indicator corresponding to unfiltered content. Further, the memory includes instructions executable by the processing logic to output at least one recommendation via the detail page. Each recommendation is associated with a member of a social network when input is received indicating a selection of the first selectable indicator.

In another particular embodiment, a method of providing recommendations is disclosed and includes receiving a selection of an offering via an online site. The method also includes outputting a detail page related to the offering via the online site. The detail page includes a first selectable indicator corresponding to a social network of a visitor and a second selectable indicator corresponding to unfiltered content. The method also includes outputting at least one recommendation via the detail page. Each recommendation is associated with a member of the social network when input received via the online site indicates a selection of the first selectable indicator.

In another particular embodiment, a computer-readable medium is disclosed having processor-readable instructions that are executable by processing logic to perform a method. The method comprises providing an online site to a visitor and receiving input indicating a selection of an offering via the online site; outputting a detail page via the online site, the detail page including a plurality of selectable indicators corresponding to a plurality of recommendation filtering options; and outputting at least one recommendation via the detail page, where the at least one recommendation is associated with one of the plurality of recommendation filtering options.

Figure 1:
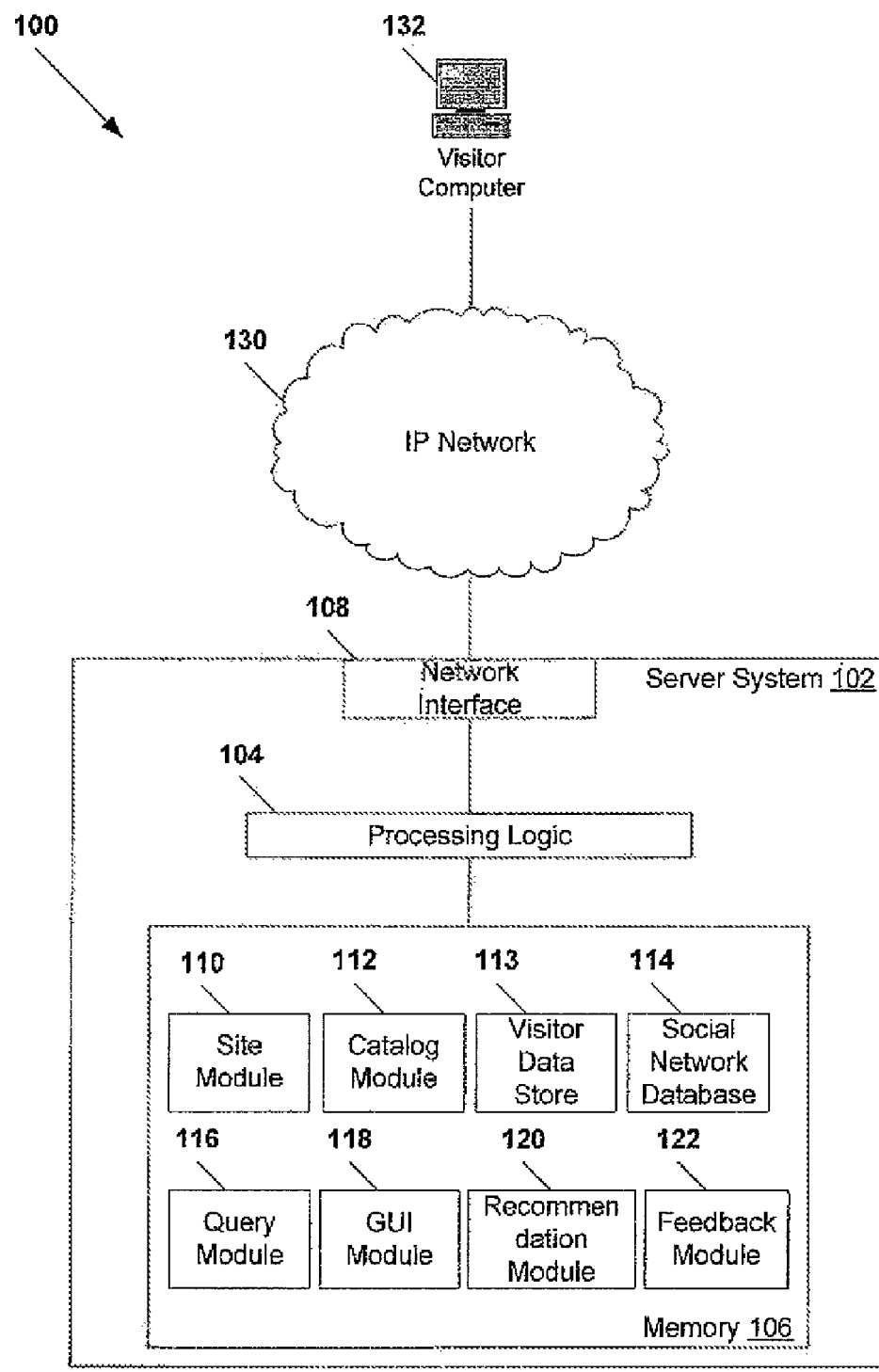
FIG. 1 is a block diagram of a particular embodiment of a system to provide recommendations.

Referring to FIG. 1, a particular embodiment of a system to provide recommendations is illustrated and designated generally 100. The system 100 includes a server system 102 that is adapted to provide an online site offering goods, services, subscriptions, other offerings, or any combination thereof, for purchase via an Internet Protocol (IP) network 130, such as the Internet. The IP network 130 can be accessible to various computers, such as a visitor computer 132, other devices, such as a web-enabled mobile communication device, or any combination thereof.

In one embodiment, the server system 102 includes a single computer server, such as a web server. Alternatively, the server system 102 includes multiple servers that independently or redundantly include logic and memory adapted to provide one or more functions with respect to fulfilling electronic commerce-based transactions. The server system 102 includes processing logic 104, such as one or more processors, and memory 106 that is accessible to the processing logic 104. The server system 102 also includes at least one network interface 108 to facilitate communication between the server system 102 and the IP network 130.

The memory 106 can include various modules 110-122 that are adapted to provide various functions of the server system 102 with respect to providing recommendations. The modules 110-122 can include processor-readable instructions that are executable by the processing logic 104, such as instructions included in one or more applications, operating systems, or other computer programs. In other embodiments, the modules 110-122 can include any combination of instructions and hardware logic.

For example, the memory 106 includes a site module 110 that is executable by the processing logic 104 to provide an online site via the IP network 130. The online site offers an electronic catalog of products, services, subscriptions, other offerings, or any combination thereof, to customers or other visitors. The memory 106 includes a catalog module 112 to store data related to the products, services, subscriptions, other offerings, or any combination thereof, that are offered via the online site. In one embodiment, the site module 110 is executable by the processing logic 104 to provide a search process via the online site, which allows visitors to search the data stored by the catalog module 112 and which returns one or more search results in response to a search request.

The memory also includes a visitor data store 113 to store data indicating offerings purchased, viewed, recommended, reviewed, or any combination thereof, by customers and other visitors to the online site. The data can be stored in association with each visitor, in one or more aggregations, or any combination thereof.

The memory includes a social network database 114 to store social network information associated with various customers or other visitors that are registered with the online site. For example, when a visitor registers with the online site, the website module 110 is executable by the processing logic 104 to prompt the visitor for contact information associated with one or more members of a social network that is to be associated with the visitor. Such contact information can include names or other identifications, e-mail addresses, telephone numbers, mobile phone numbers, IP addresses, other contact information, or any combination thereof. The website module 110 is executable by the processing logic 104 to receive contact information that is entered via the visitor computer 132. Further, the website module 110 is executable by the processing logic 104 to import the contact information from a contact list at the visitor computer 132, from an address book or other contact list at a customer phone, from an online social networking site or other additional site provided by the IP network 130, or any combination thereof. The social network database 114 can store one or more social networks associated with a visitor. In an illustrative embodiment, members of social networks can overlap.

The memory 106 include a query module 116 that is executable by the processing logic 104 to query the social network database 114 to identify one or more social networks associated with a visitor, in response to a selection of a product or offering via the online site. In addition, the memory 106 includes a graphical user interface (GUI) module 116 that is executable by the processing logic 104 to provide various graphical user interfaces including interactive graphical elements via the online site. For example, the GUI module 116 can be executable by the processing logic 104 to provide a detail page, such as a product-detail page, via the online site in response to a selection of a product from search results or another page of the online site. The GUI module 116 is executable by the processing logic 104 to include with the detail page a plurality of selectable indicators corresponding to various recommendation filters.

Figure 4:
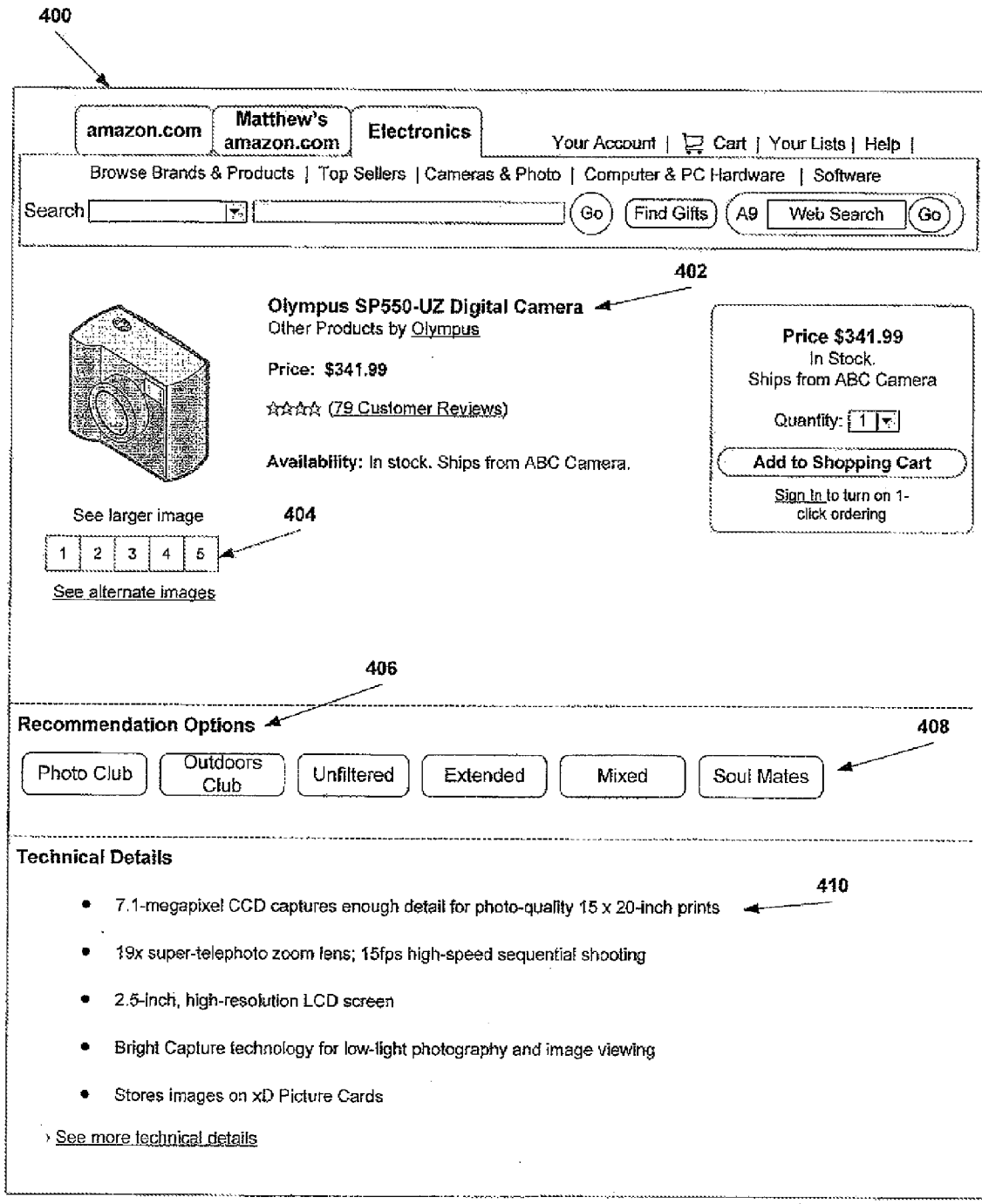
FIG. 4 is a diagram of a particular embodiment of a graphical user interface to provide recommendations.
Figure 5:
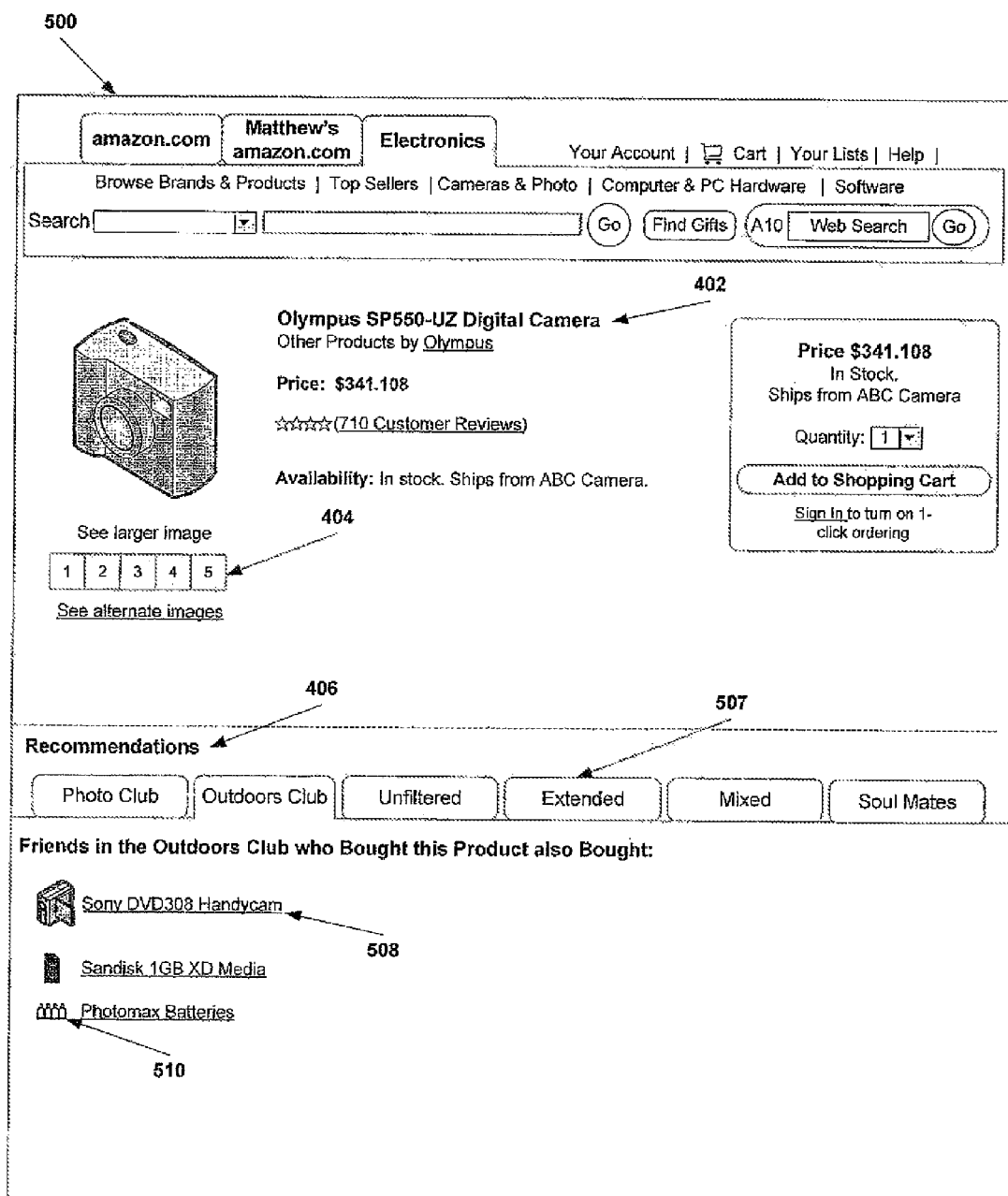
FIG. 5 is a diagram of a second particular embodiment of a graphical user interface to provide recommendations.
Figure 6:
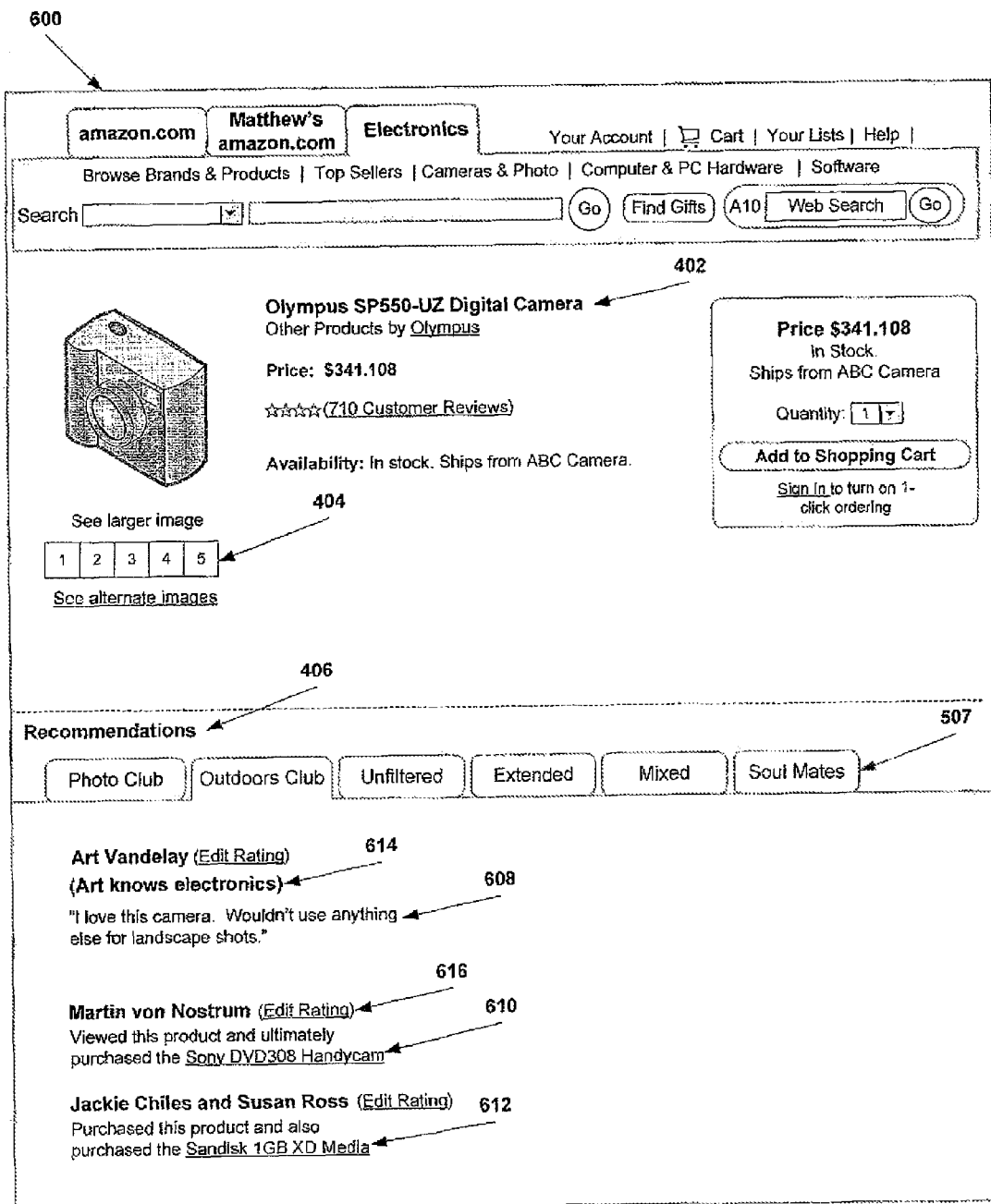
FIG. 6 is a diagram of a third particular embodiment of a graphical user interface to provide recommendations.

For instance, at least one selectable indicator corresponds to recommendations based on one or more social networks associated with the visitor, as identified via the query module 116. Another selectable indicator corresponds to unfiltered recommendations that do not exclude registered users of the online site that are outside the social network(s) associated with the visitor. Yet another selectable indicator corresponds to mixed results that include recommendations based on one or more social networks and unfiltered recommendations. Still another selectable indicator corresponds to extended recommendations that include members of other social networks, where the other social networks are associated with members of the visitor's social network(s). Another selectable indicator corresponds to profile-based recommendations, such as recommendations based on behavior of customers or other visitors that share purchasing history, viewing history, demographic data, or any combination thereof, with the visitor. Examples of such detail pages are illustrated in FIGS. 4-6.

The memory 106 includes a recommendation module 120 that is executable by the processing logic 104 to generate recommendations related to a product or other offering selected by a visitor and to output the recommendations via a detail page. The recommendation module 120 is executable by the processing logic 104 to determine the recommendations based on offerings that are viewed, purchased, recommended, reviewed, or any combination thereof, by other visitors registered with the online site, by one or more members of a social network associated with the visitor, or according to other filters selected by the visitor.

For instance, recommendations can include one or more indications that a member of a social network of the visitor purchased the offering; one or more indications that a member of the social network of the visitor viewed the offering; reviews of the offering from members of the social network that purchased the offering; one or more similar offerings viewed or purchased by a member of the social network; one or more related offerings viewed or purchased by a member of the social network; or any combination thereof.

In another example, recommendations can include similar offerings purchased by visitors outside the social network who viewed the offering selected by the visitor; similar offerings viewed by such other visitors; related offerings purchased by such other visitors (e.g., memory purchased by customers that purchased a digital camera); related offerings viewed by such other visitors; or any combination thereof. In another embodiment, the recommendations can be output as aggregates, such as products purchased by members of a certain social network who also purchased the offering viewed by the visitor. Examples of recommendations are illustrated in FIGS. 5-6.

In a particular embodiment, the memory 106 includes a feedback module 122 that is executable by the processing logic 104 to receive ratings from a visitor associated with the social network that includes the members whose recommendation is output via the online site. For example, the ratings can indicate a level of trust associated with a member in general, with respect to a product category (e.g., Art is trusted highly regarding electronics), with respect to other factors, or any combination thereof. Ratings can be stored in association with member data at the social network database 114 and can be output with future responsive data received from the member and output to the visitor that designated the trust level or other rating.

Figure 2:
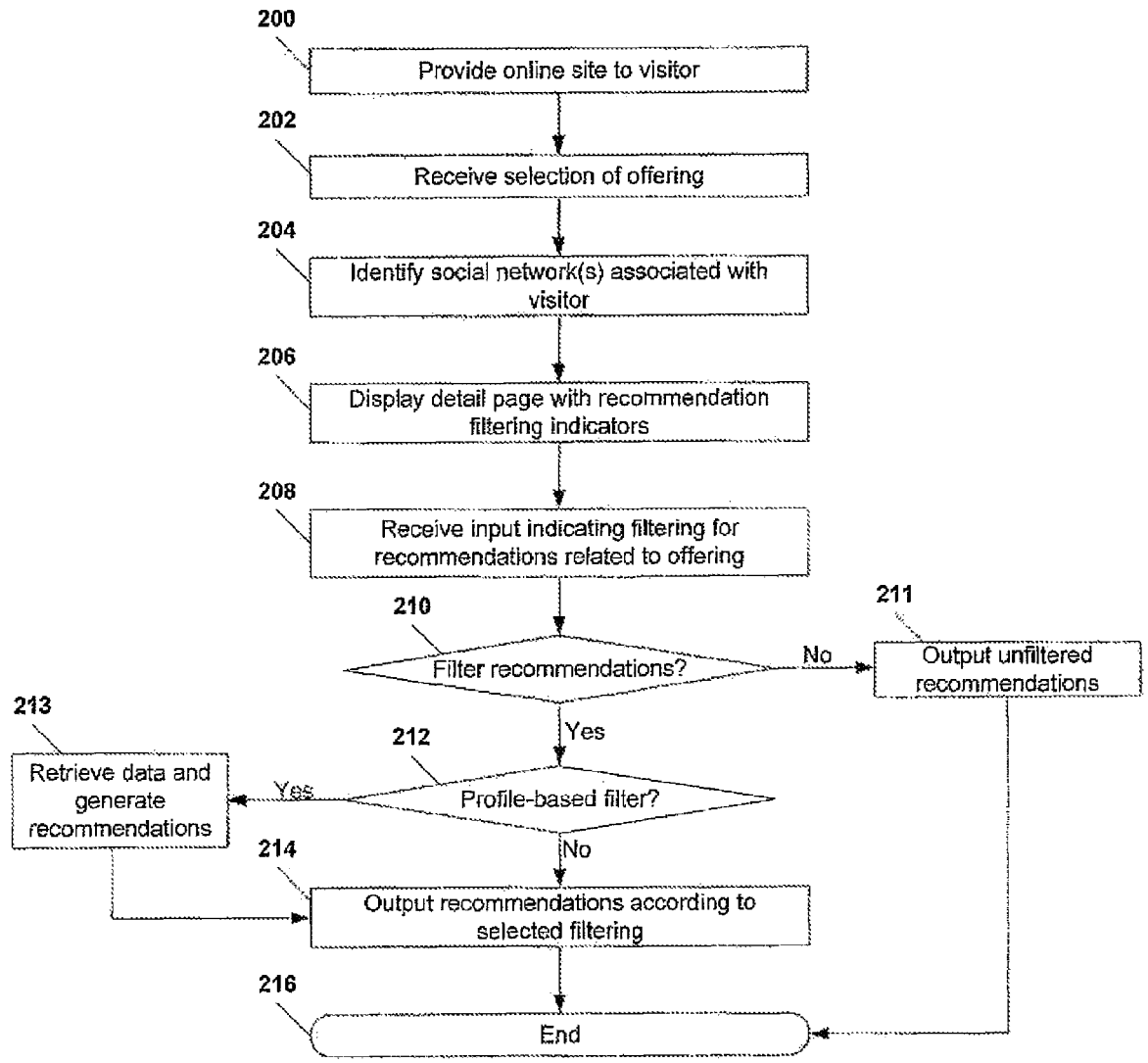
FIG. 2 is a flow diagram of a particular embodiment of a method of providing recommendations.

Referring to FIG. 2, a flow diagram of a particular embodiment of a method of providing recommendations is illustrated. At block 200, a server system provides an online site to a visitor, such as a customer, via a computing device, mobile phone, or other device. The online site provides a catalog of goods, services, subscriptions, other offerings, or any combination thereof, for purchase. Moving to block 202, the server system receives a selection of an offering from the customer via the online site. Proceeding to block 204, the server system identifies at least one social network associated with the visitor.

Continuing to block 206, the server system displays a detail page related to the offering via the online site. The detail page includes a plurality of selectable recommendation filtering indicators. The indicators correspond to at least one social network of the visitor, to unfiltered recommendations, to extended recommendations, to mixed recommendations, or any combination thereof. Examples of such indicators are illustrated in FIGS. 4-5, Advancing to block 208, the server system receives input indicating a selection of one of the recommendation filtering indicators.

At decision 210, the server system determines whether the selection indicates that recommendations are to be filtered. If the recommendations are not to be filtered, the method moves to block 211, and the server system outputs unfiltered recommendations to the visitor via the detail page or another graphical user interface of the online site. The method then terminates at 216.

Whereas, if recommendations are to be filtered, the method proceeds to decision node 212, and the server system determines whether the selected filter is a profile-based filter. If the selected filter is not a profile-based filter, the method advances to 214. Conversely, if the selected filter is a profile-based filter, the method moves to block 213, and the server system retrieves data related to other visitors who share profile attributes with the visitor, such as purchasing history, viewing history, demographic data, or any combination thereof. Further, the server system generates recommendations based on the retrieved data. At block 214, the server system outputs filtered recommendations corresponding to the selected filtering indicator. The method terminates at 216.

Figure 3:
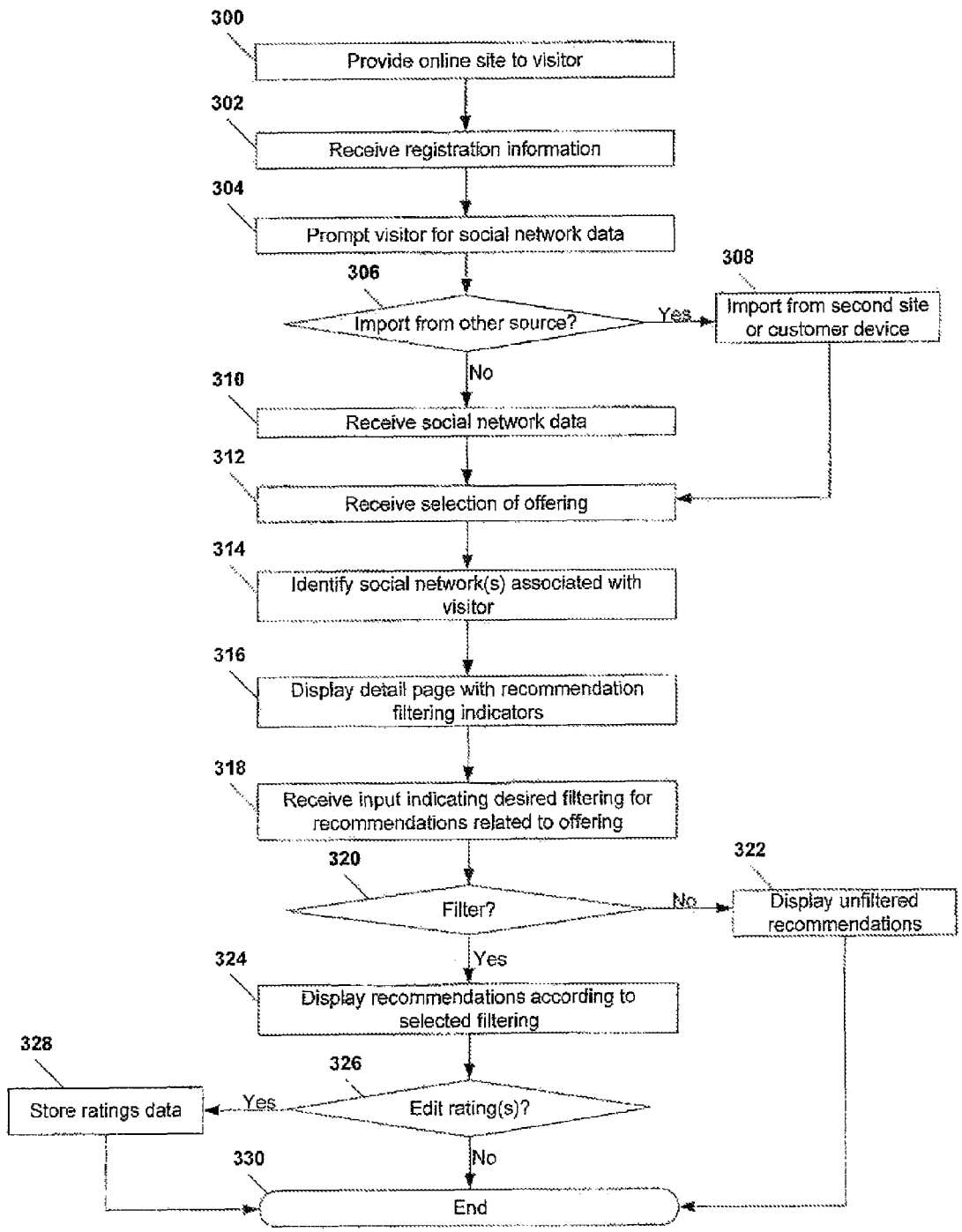
FIG. 3 is a flow diagram of a second particular embodiment of a method of providing recommendations.

Referring to FIG. 3, a flow diagram of a second particular embodiment of a method of providing recommendations is illustrated. At block 300, a server system provides an online site to a visitor. The online site provides a catalog of goods, services, subscriptions, other offerings, or any combination thereof, for purchase. Moving to block 302, the server system receives registration information from the visitor, such as a name, contact information, credit information, other information to establish an account, or any combination thereof. Proceeding to block 304, the server system prompts the visitor for data related to one or more social networks that are to be associated with the visitor. For instance, the server system prompts the visitor for contact information of one or more members that are to be associated with the social network(s).

Continuing to decision 306, the server system determines whether it has received a command to import social network data from another source, such as a computing device or mobile phone of the visitor, or from another online site, such as a social networking site. If the server system has received a command to import social network data from another source, the method advances to block 308, and the server system imports the social network data from another source, such as another online site or a visitor device. The method then moves to block 312. Conversely, if the server system does not receive a command to import social network data from another source, the method advances to block 310, and the server system receives the social network from the visitor via a social network setup process provided via the online site. The method then moves to block 312.

Moving to block 312, the server system receives a selection of an offering, such as a product, from the visitor via the online site. Proceeding to block 314, the server system identifies at least one social network associated with the visitor. Continuing to block 316, the server system displays a detail page related to the offering, such as a product detail page, via the online site. The detail page includes a plurality of selectable recommendation filtering indicators. The indicators correspond to at least one social network of the visitor, to unfiltered recommendations, to extended recommendations, to mixed recommendations, or any combination thereof. Examples of such indicators are illustrated in FIGS. 5-6. Advancing to block 318, the server system receives input indicating a selection of one of the recommendation filtering indicators.

At decision 320, the server system determines whether the selection indicates that recommendations are to be filtered. If the recommendations are not to be filtered, the method moves to block 322, and the server system outputs unfiltered recommendations to the visitor via the detail page or another graphical user interface of the online site. Whereas, if recommendations are to be filtered, the method proceeds to block 324, and the server system outputs filtered recommendations corresponding to the selected filtering indicator.

Continuing to block 326, the server system determines whether to edit rating information associated with one or more members whose responsive data has been output via the product detail page. For instance, the server system can determine whether it has received a request from the visitor to designate ratings. Alternatively, the server system can determine whether it has received input from the visitor indicating whether responsive data from a particular member was helpful or not helpful, whereupon the server system can automatically adjust a rating associated with the particular member. If the server system determines to edit rating information, the method advances to block 328, and the ratings data is received and stored. The method terminates at 330.

In some embodiments, the methods disclosed herein may be performed as described. In other embodiments, certain aspects of the methods may be performed in alternate sequences or simultaneously. In addition, registration, social network setup, selection of an offering, or any combination thereof, may occur in a single session or in different sessions with the online site. Further, while the methods are largely described with reference to products, the methods may be applied to products, services, subscriptions, other online offerings, or any combination thereof.

Referring to FIG. 4, a diagram of a particular embodiment of a graphical user interface (GUI) to provide recommendations is illustrated. The GUI 400 includes a detail page related to a product 402. The detail page includes, for example, one or more images 404 associated with the product 402 and technical details or specifications 410 related to the product 402. In a particular embodiment, the GUI 400 includes a recommendation options region 406 that displays a plurality of selectable indicators 408 corresponding to recommendation filtering options. The plurality of selectable indicators can correspond to at least one social network of the visitor (e.g., photo club and outdoors club), to unfiltered recommendations, to extended recommendations, to mixed recommendations, to profile-based recommendations based on visitors sharing common behaviors or demographic data with the visitor (e.g., "soul mates" tab), or any combination thereof.

Referring to FIG. 5, a diagram of a second particular embodiment of a graphical user interface (GUI) to provide recommendations is illustrated. The GUI 500 includes a detail page related to a product 402. The detail page includes, for example, one or more images 404 associated with the product 402. In a particular embodiment, the GUI 500 includes a recommendation options region 406 that displays a plurality of selectable indicators, such as tabs 507, corresponding to the recommendation filtering option indicators shown at 408 in FIG. 4. The plurality of selectable tabs can correspond to at least one social network of the visitor (e.g., photo club and outdoors club), to unfiltered recommendations, to extended recommendations, to mixed recommendations, to profile-based recommendations, or any combination thereof.

Further, the GUI 500 includes recommendations corresponding to a selected indicator, such as the indicator corresponding to the outdoors club. Recommendations can include one or more indications that, in aggregate, members of the selected social network who purchased the offering 402 also purchased one or more other offerings 508. For example, the recommendations can indicate that members of an outdoors club who purchased a digital camera also purchased batteries, memory media, video equipment, or any combination thereof. In an illustrative embodiment, the recommendations can include an image 510 of each recommended offering.

Referring to FIG. 6, a diagram of a second particular embodiment of a graphical user interface (GUI) to provide recommendations is illustrated. The GUI 600 includes a detail page related to a product 402. The detail page includes, for example, one or more images 404 associated with the product 402. In a particular embodiment, the GUI 600 includes a recommendation options region 406 that displays a plurality of selectable indicators, such as tabs, 607 corresponding to the recommendation filtering option indicators shown at 408 in FIG. 4. The plurality of selectable tabs can correspond to at least one social network of the visitor (e.g., photo club and outdoors club), to unfiltered recommendations, to extended recommendations, to mixed recommendations, or any combination thereof.

Further, the GUI 600 includes recommendations 608-612 corresponding to a selected indicator, such as the indicator corresponding to the outdoors club. Recommendations can include one or more indications that a party associated with the selected filtering option (e.g., a member of a selected social network) purchased the offering; one or more reviews 608 by customers associated with the selected filtering option who purchased the product 402; one or more indications of similar products 610 purchased by customers associated with the selected filtering option who viewed the product 402; one or more related products purchased by customers associated with the selected filtering option who purchased the product 402; or any combination thereof. When the filtering option is a social network of the visitor, one or more members of the social network can be associated with a trust level 614 or other rating previously designated by the visitor. In an illustrative embodiment, a selectable indicator 616 of an option to edit a rating can be displayed in conjunction with each member identification.

Figure 7:
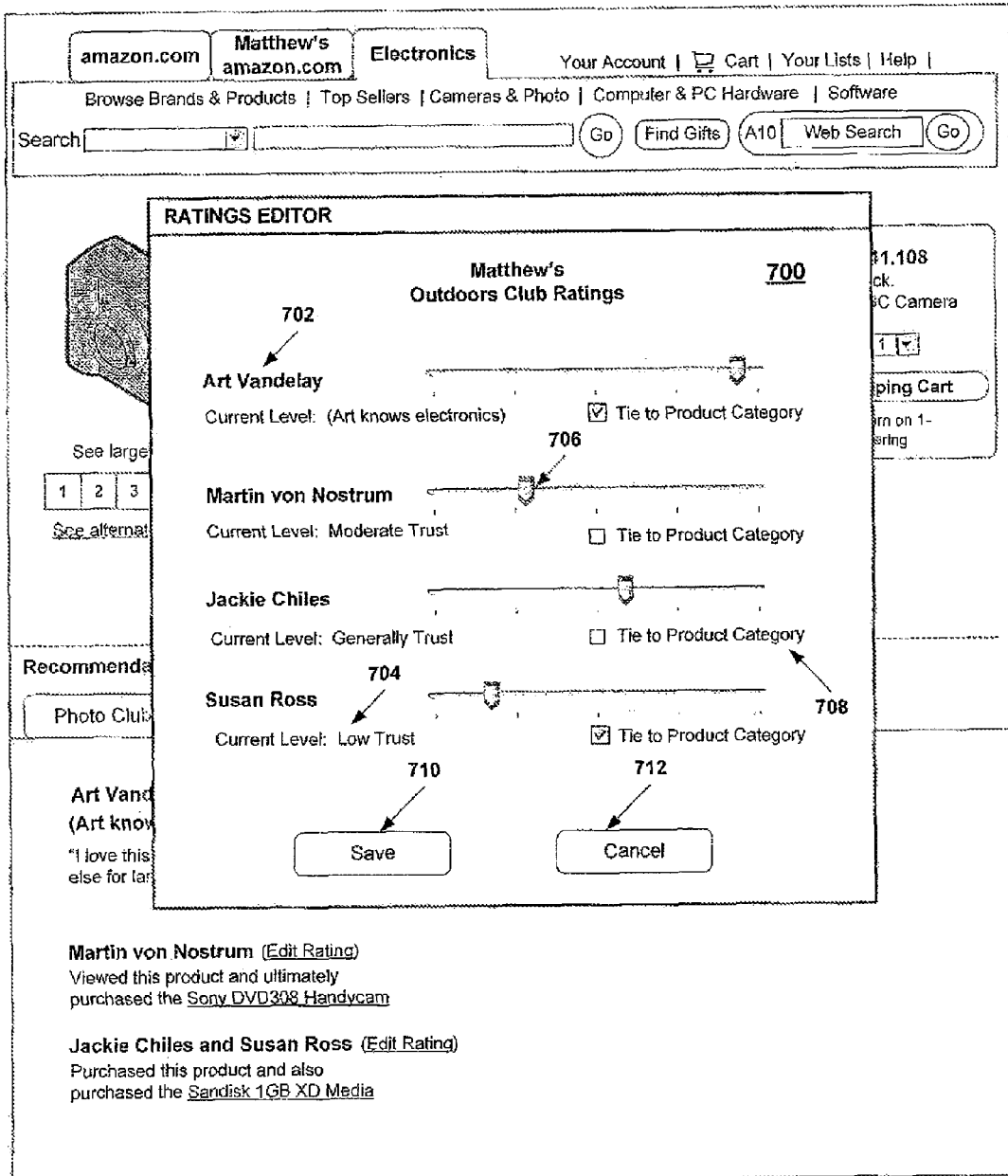
FIG. 7 is a diagram of a particular embodiment of a graphical user interface to adjust ratings.

Referring to FIG. 7, a diagram of a particular embodiment of a graphical user interface (GUI) to adjust ratings is illustrated. In the embodiment illustrated in FIG. 7, the GUI 700 takes the form of a pop-up window overlaying a product detail page. In other embodiments, the GUI 700 can take the form of a separate page of an online site or a sidebar provided by the online site. The GUI 700 includes identifications 702 of at least one member associated with a social network of a visitor to the online site. The GUI 700 also includes a current rating, such as a current trust level associated with each member. Further, the GUI 700 includes a graphical tool, such as a slider bar 706, which is adjustable to edit a rating associated with each member of the social network. As shown, a rating can include, for instance, complete trust, moderate trust, general trust, low trust, no trust, or any combination thereof. In addition, the GUI 700 includes a selectable indicator 708 of an option to tie the trust rating to a product category associated with the product detail page. In an illustrative embodiment, the GUI 700 includes an indicator 710 of an option to save rating levels and an indicator 712 of an option to cancel the rating edit process and exit the GUI 700.

In conjunction with the configuration of structure described herein, a system and method of providing recommendations is provided that allows a visitor to an offline site to select filtered, unfiltered, or mixed recommendations related to an offering that is available for purchase via the online site. Allowing the visitor to select filtered recommendations based on a social network of the visitor can reduce the number of recommendations output to the visitor and increase the value of each recommendation to the visitor.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing recommendations, the method comprising:
 receiving a selection of an offering via an online site;
  generating, by a server, a detail page related to the offering;
   outputting the detail page related to the offering via the online site, the detail page including a first selectable indicator corresponding to an extended social network of a visitor and a second selectable indicator corresponding to unfiltered content, wherein the extended social network includes a set of members of a first social network of the visitor and a set of members of a second social network, and wherein the set of members of the second social network includes at least one member from the set of members of the first social network of the visitor; and in response to selection of the first selectable indicator, causing the display of at least one recommendation via the detail page, wherein each recommendation is associated with a member of the extended social network.

2. The method of claim 1, wherein the extended social network is one of a plurality of social networks associated with a visitor with whom the selection of the offering is associated and wherein the detail page includes a plurality of selectable indicators corresponding to the plurality of social networks.

3. The method of claim 1, wherein the at least one recommendation indicates that at least one member of the extended social network at least one of purchased the offering, viewed the offering, reviewed the offering, purchased a related offering, viewed a related offering, purchased a similar offering, and viewed a similar offering.

4. The method of claim 1, wherein the at least one recommendation includes at least one aggregated recommendation based on aggregated data associated with a plurality of members of the extended social network.

5. The method of claim 1, wherein the detail page includes a third selectable indicator, the method further comprising, in response to selection of the third selectable indicator, excluding from the detail page recommendations by users outside the set of members of first social network of the visitor.

6. The method of claim 1, wherein the at least one recommendation indicates that the associated member of the extended social network is a member of the at least one social network of the visitor.

7. The method of claim 1, wherein at least one member of the extended social network is associated with a trust level.

8. The method of claim 7, wherein the trust level is pre-designated by the visitor.

9. The method of claim 7 further comprising:
receiving input from the visitor that indicates a helpfulness of a previous recommendation associated with the at least one member; and
updating the trust level associated with the at least one member based on the input.

10. The method of claim 7, wherein each trust level indicates a confidence in a member with respect to a product category.

11. The method of claim 7 further comprising:
receiving a selection of an option to edit the trust level associated with at least one member of the extended social network; and
causing the generation of a graphical user interface via the online site, wherein the graphical user interface is adapted to receive inputs to edit each trust level.

12. The method of claim 11, wherein the graphical user interface includes at least one graphical slider bar, wherein each graphical slider bar is adjustable to indicate a trust level associated with a member of the social network.

13. The method of claim 7, wherein the trust level comprises at least one of one of complete trust, general trust, low trust, moderate trust, and no trust.

14. A system to provide recommendations, the system comprising:
a server system including processing logic and memory accessible to the processing logic, wherein the memory includes instructions executable by the processing logic to cause the server system to:
provide an online site;
receive input indicating a selection of an offering via the online site;
cause the generation of a detail page via the online site, the detail page including a first selectable indicator corresponding to an extended social network of a visitor and a second selectable indicator corresponding to unfiltered content, wherein the extended social network includes a set of members of a first social network of the visitor and a set of members of a second social network, and wherein the set of members of the second social network includes at least one member from the set of members of the first social network of the visitor; and
in response to selection of the first selectable indicator, cause the display of at least one recommendation via the detail page, wherein each recommendation is associated with a member of the extended social network.

15. The system of claim 14 further comprising a data store adapted to store an electronic catalog of products, services, or any combination thereof, to be offered for sale via the online site, the electronic catalog including the selected offering.

16. The method of claim 14, wherein the extended social network is one of a plurality of social networks associated with a visitor with whom the selection of the offering is associated and wherein the detail page includes a plurality of selectable indicators corresponding to the plurality of social networks.

17. The system of claim 14, wherein the server system is further operable to receive contact information related to members of the extended social network prior to the request and to store the contact information at a social network database of the server system.

18. The system of claim 17, wherein the server system is further operable to prompt a visitor for the contact information during a social network setup process provided via the online site.

19. The system of claim 17, wherein the server system is further operable to receive the contact information from a second online site.

20. The system of claim 17, wherein the server system is further operable to receive the contact information from a communication device.

21. The system of claim 20, wherein the communication device comprises a web-enabled mobile phone device.

22. A non-transitory computer-readable storage medium having processor-readable instructions that are executable by processing logic to perform a method, the method comprising:
providing an online site to a visitor;
receiving input indicating a selection of an offering via the online site;
causing the generation of a detail page via the online site, the detail page including a first selectable indicator corresponding to an extended social network of a visitor and a second selectable indicator corresponding to unfiltered content, wherein the extended social network includes a set of members of a first social network of the visitor and a set of members of a second social network, and wherein the set of members of the second social network includes at least one member from the set of members of the first social network of the visitor; and in response to selection of the first selectable indicator, outputting at least one recommendation via the detail page, wherein each recommendation is associated with a member of the extended social network.

23. The method of claim 22, wherein: the detail page includes a third selectable indicator, the method further comprising, in response to selection of the third selectable indicator, excluding from the detail page recommendations by users outside the set of members of first social network of the visitor.

24. The method of claim 23, wherein the at least one recommendation indicates that the associated member of the extended social network is a member of the at least one social network of the visitor.

25. The method of claim 23, wherein the offering comprises a product, service, or subscription.

* * * * *